(12) United States Patent
Palmer

(10) Patent No.: US 10,233,545 B2
(45) Date of Patent: Mar. 19, 2019

(54) METHOD FOR PRODUCING PARTICULATE CLUSTERS

(75) Inventor: Richard Palmer, Stourbridge (GB)

(73) Assignee: The University of Birmingham, Birmingham (GB)

( * ) Notice: Subject to any disclaimer, the term of this patent is extended or adjusted under 35 U.S.C. 154(b) by 1081 days.

(21) Appl. No.: 14/236,386

(22) PCT Filed: Jul. 31, 2012

(86) PCT No.: PCT/GB2012/051854
§ 371 (c)(1),
(2), (4) Date: Apr. 16, 2014

(87) PCT Pub. No.: WO2013/017870
PCT Pub. Date: Feb. 7, 2013

(65) Prior Publication Data
US 2014/0308458 A1    Oct. 16, 2014

(30) Foreign Application Priority Data

Aug. 1, 2011 (GB) .................................. 1113168.7

(51) Int. Cl.
| | | |
|---|---|---|
| *B22F 1/00* | (2006.01) | |
| *C23C 26/00* | (2006.01) | |
| *B82Y 30/00* | (2011.01) | |
| *B22F 9/12* | (2006.01) | |

(52) U.S. Cl.
CPC ............ *C23C 26/00* (2013.01); *B22F 1/0018* (2013.01); *B22F 1/0096* (2013.01); *B82Y 30/00* (2013.01); *B22F 9/12* (2013.01); *B22F 2998/10* (2013.01)

(58) Field of Classification Search
CPC ....................................................... C23C 26/00
USPC ......................................................... 427/212
See application file for complete search history.

(56) References Cited

U.S. PATENT DOCUMENTS

| | | | |
|---|---|---|---|
| 6,395,156 B1* | 5/2002 | Hsueh | C23C 14/46 204/192.11 |
| 8,039,107 B2 | 10/2011 | Asada et al. | |
| 8,124,785 B2 | 2/2012 | Torimoto et al. | |
| 2009/0286099 A1 | 11/2009 | Asada et al. | |
| 2009/0306394 A1 | 12/2009 | Torimoto et al. | |
| 2011/0318484 A1 | 12/2011 | Asada et al. | |

FOREIGN PATENT DOCUMENTS

| | | |
|---|---|---|
| CN | 2012800484102 | 2/2016 |
| JP | 58-133307 | 8/1983 |
| JP | 60-212219 | 10/1985 |

(Continued)

OTHER PUBLICATIONS

Crisan, Surface-functioanlized core-shell nanoparticles by novel gas/cluster aggregation method, Journal of Optoelectronics and Avanced Materials, vol. 12 No. 2, Feb. 2010, p. 184-192.*

(Continued)

*Primary Examiner* — Tabatha L Penny
(74) *Attorney, Agent, or Firm* — Wells St. John P.S.

(57) ABSTRACT

A method for producing particulate clusters comprises passing a core through an array of matrix-supported coating particles. Particulate clusters produced by the method may find application as catalytic particles, components of novel electronic and photonic materials and sensors, and as binding sites for protein molecules in biochips.

15 Claims, 4 Drawing Sheets

(56) References Cited

FOREIGN PATENT DOCUMENTS

| JP | 62-112711 | 5/1987 |
|---|---|---|
| JP | 63-016043 | 1/1988 |
| JP | 3-118829 | 5/1991 |
| JP | 2007-231306 | 9/2007 |
| JP | 2014-523387 | 3/2016 |
| JP | 2014-523387 | 11/2016 |
| WO | WO 2006/126527 | 11/2006 |
| WO | WO 2006/132308 | 12/2006 |
| WO | WO 2010/092297 | 8/2010 |
| WO | PCT/GB2012/051584 | 9/2012 |
| WO | PCT/GB2012/051854 | 9/2012 |
| WO | PCT/GB2012/051854 | 2/2014 |

OTHER PUBLICATIONS

Tavernier, Experimental Techniques in Nuclear and Particle Physics, Chapter 2:Interactions of Particles in Matter, Springer-Verlag Berlin Heidelberg, Feb. 2010, p. 23-53.*

Ghalab, Metal Cluster Sputtering under reactive Ion Bombardment investigated by TOF-SNMS-Laser-System, Dissertation, Jul. 21, 2005, p. 1-134.*

Ayadi, Electrical and optical properties of aluminum-doped zinc oxide sputtered from an aerogel nanopowder target, Nanotechnology 18, 2007, 445702, 6pp.*

Pratontep, Size-selected cluster beam source based on radio frequency magnetron plasma sputtering and gas condensation, Review of Scientific Instruments, 76, 045103 (2005).*

Characterization of a cryogenically cooled high-pressure gas jet for laser/cluster interaction experiments, Review of Scientific Instruments, vol. 69, No. 11, Nov. 1998, p. 3798-3804 (Year: 1998).*

Balasubramanian et al., "Synthesis of Monodisperse TiO2-Paraffin Core-Shell Nanoparticles for Improved Dielectric Properties", ACS Nano vol. 4, No. 4 (Apr. 27, 2010) United States, pp. 1893-1900.

Crisan et al., "Surface-Functionalized Core-Shell Nanoparticles by Novel Gas/Cluster Aggregation Method", Journal of Optoelectronics and Advanced Materials vol. 12, No. 2 (Feb. 2010) Romania. pp. 184-192.

Mazalova et al., "Small Copper Clusters in Ar Shells: A Study of Local Structure", Journal of Physical Chemistry vol. 113, No. 21 (May 28, 2009) United States, pp. 9086-9091.

Yin et al., "Controlled Formation of Mass-Selected Cu—Au Core-Shell Cluster Beams", Journal of the American Chemical Society vol. 133, No. 27 (Jul. 13, 2011) United States, pp. 10325-10327.

Nepijko et al., "Morphology of Frozen Rare-Gas Layers", ChemPhysChem vol. 6 (Feb. 4, 2005) Germany, pp. 235-238.

* cited by examiner

METHOD FOR PRODUCING PARTICULATE CLUSTERS

CROSS REFERENCE TO RELATED APPLICATION

This application is a 35 U.S.C. § 371 of and claims priority to PCT International Application No. PCT/GB2012/051854 which was filed on 31 Jul. 2012 (31 Jul. 2012), and was published in English, and claims priority to GB Patent Application No. 1113168.7, which was filed on 1 Aug. 2011 (1 Aug. 2011), the teachings of which are incorporated herein by reference.

This invention relates to a method for making particulate clusters. Such clusters are the subject of the cross-disciplinary field of cluster science, which involves studying particles of nanometer dimensions. Clusters typically consist of between 2 and 200,000 atoms, and thus have diameters of 0.2-20 nm. Clusters show potential applications as, for example, catalytic particles, components of novel electronic and photonic materials and sensors, and as binding sites for protein molecules in biochips.

Existing methods for making particulate clusters typically involve vaporisation (such as by plasma) of a substrate, followed by condensation at relatively low concentrations into a rare gas. This allows the material to condense as relatively small clusters, rather than bulk particles.

The properties of particulate clusters are greatly dependent on the size of the cluster, and there is therefore a need to be able to produce clusters of a particular size. In particular, certain 'magic number' sizes of clusters exist having particular stability. In existing methods, this is generally achieved by filtering the required sizes of cluster by mass from a cluster population having a relatively wide distribution of cluster sizes (such as a population produced by the condensation method referred to above). Such mass selection may be achieved with a quadropole or traditional 'time-of-flight' mass spectrometer, or with the mass selector described in European Patent No. EP 0 883 893.

However, all such methods have an inherent inefficiency, in that a proportion of the clusters produced are discarded because they lie outside the required size range. The narrower the required range of sizes, the greater this inefficiency will be. The best size-selected cluster sources currently known can produce approximately 1 µg of clusters per day, which is sufficient only for highly specialised demonstrations of e.g. cluster catalytic activity. However, in order to be commercially useful, e.g. in pharmaceutical/fine chemical applications, productivity of the order of 1 kg/day would be desirable. There is therefore a need for a method of producing clusters in which such inefficiencies can be avoided.

It is also known to produce clusters having a composite structure, such as a core (at least partially) surrounded by a shell. There are three known classes of methods for achieving such structures. In the first, the cores are deposited on a surface, and the coating material is condensed onto the surfaces of the cores. However, this can result in uneven distribution of the coating material over a core or between different cores. Furthermore, the coating material deposited on the surface between individual cores is wasted.

In the second method, the source material from which the clusters are vaporised consists of both core and coating material. In order to form clusters, the material is vaporised and condensed. However, there is only limited control over the structure of the resulting clusters, which again reduces the effectiveness of the process.

The third method involves spraying or condensing coating particles onto a beam of core particles. This requires specialised and expensive apparatus, and the rate at which composite clusters can be produced is inherently limited by the core particle beam flux. There is therefore a need for an improved method for producing composite clusters.

The present invention has been conceived with the above problems in mind.

According to the invention, there is provided a method for producing particulate clusters, comprising passing a core through an array of matrix-supported coating particles.

Without wishing to be bound by theory, it is believed that collisions between the core and the matrix-supported coating particles cause the coating particles to be agglomerated around the core, producing a particulate cluster. In some embodiments, however, the core is not retained by the particulate cluster which emerges from the array of matrix-supported coating particles.

It will be understood that the array of coating particles may be in the form of discrete particles of coating material. Alternatively, the array of coating particles may be in the form of a continuous network of coating material. Of course, it will be understood that, at the atomic or molecular level, even a bulk solid can be considered to consist of discrete atomic or molecular particles.

As used herein, the term 'matrix-supported' is intended to mean that the coating particles are held in fixed relative positions by a matrix. The method is therefore distinguished from dynamic systems in which coating particles are effectively condensed onto a core from a plasma or the like. The use of matrix-supported coating particles allows the distribution and density of the coating particles to be controlled; thus, the properties of the resulting particulate clusters can be more easily controlled.

In some embodiments, the array of matrix-supported coating particles is a two-dimensional array of coating particles, such as for example a layer of coating particles on an external surface of a matrix. The term 'two-dimensional' should not be understood to require that the array has no thickness (or only a minimum thickness, such as the thickness of one particle) in a third dimension, although this may be the case in some embodiments. Rather, the term indicates that there is no substantial distribution of particles in the third dimension, in comparison to the first and second dimensions. Accordingly, the thickness of the array in the third dimension is typically several orders of magnitude smaller than the sizes in the first and second dimensions. For example, the minimum size in the first and second dimensions may be at least 10, at least 20, at least 50, at least 100, at least 200, at least 500, at least 1000, at least 2000, at least 5000, at least $10^4$, at least $10^5$, at least $10^6$, at least $10^7$, at least $10^8$ or at least $10^9$ times the maximum thickness in the third dimension.

In some alternative embodiments, the array of matrix-supported coating particles is a three-dimensional array of coating particles, such as for example a suspension or dispersion of particles throughout a three-dimensional matrix.

It will be understood that the core behaves as a single particle. Whilst not essential, in some embodiments the core may be substantially spherical. In some embodiments, the core consists of a simple particle, such as an ion, atom or molecule. In a particular embodiment, the core consists of a single atom. In some alternative embodiments, the core consists of a complex particle, such as for example a cluster of one or more types of ion, atom and/or molecule. Typical sources for the core include an ion beam, and a prior art molecular cluster source. The ion beam may be an atomic ion beam, such as an Ar⁺ beam.

Similarly, the coating particles may be individual atoms or molecules, or may be clusters of atoms or molecules, such as for example metallic clusters. The coating particles may be neutral or electrostatically-charged. In some embodiments, all coating particles may be of the same material. In some further embodiments, all coating particles may be of similar size. For example, at least 50% of the coating particles may have a diameter which is within 90%, 80%, 70%, 60%, 50%, 40%, 30%, 25%, 20%, 15%, 10%, 5%, 2%, or 1% of the mean diameter. Alternatively or additionally, at least 55%, at least 60%, at least 65%, at least 70%, at least 80% or at least 90% of the coating particles may have a diameter which is within 50% of the mean diameter. As used herein, 'diameter' refers to the maximum dimension, and does not necessarily imply a spherical shape or circular cross-section, although this may be true in some embodiments. In particular, the present inventors have found that atomic coating particles can be generated efficiently, whereas the production of monodisperse clusters is more difficult. Nevertheless, in some embodiments, it may be desirable to use clusters as coating particles.

In some embodiments, the coating particles may have the same chemical composition as the core. In other words, the coating particles may consist of the same atomic types as the core, with the same ratio between different atomic types (where present). It is not essential for these embodiments that the coating particles should be the same size as the core, or that they should carry the same electrostatic charge, although either or both of these features may be present in some further embodiments. Alternatively, in some further embodiments the electrostatic charge on the coating particles (which may be zero) is different (whether in magnitude, polarity, or both) to that of the core.

In some embodiments, the coating particles are metallic or semi-metallic particles. Thus, for example, the coating particles may be atoms or clusters of Au, Ag, Cu, Pt, Pd, Ni, Ir, Rh, Co, Fe, Mn, Cr, Si or Ge. In some embodiments the coating particles are atoms or clusters of Au, Pt, Pd or Rh. In some still further embodiments, the coating particles are atoms of Au, Pt, Pd or Rh.

In some embodiments, the array of coating particles comprises more than one type of coating particle.

In some embodiments, the method comprises passing a series of similarly-sized cores through the array of matrix-supported coating particles along different paths such that each core encounters a similar number of coating particles. For example, at least 50% of the cores may encounter a number of coating particles which is within 20%, 15%, 10%, 5%, 2%, 1%, 0.7%, 0.6%, 0.5%, 0.4%, 0.3%, 0.2%, 0.1%, or 0.05% of the mean number of coating particles. Alternatively or additionally, at least 55%, at least 60%, at least 65%, at least 70%, at least 80% or at least 90% of the cores may encounter a number of coating particles which is within 50% of the mean number. Without wishing to be bound by theory, it is believed that this allows the creation of a series of particulate clusters with similarly-sized coatings. In particular, if the particulate clusters are made with similarly sized (or identical) cores, such embodiments allow the creation of a series of similarly-sized particulate clusters.

In some further embodiments, the method further comprises determining a required size of particulate cluster, and passing the series of cores through the array of matrix-supported coating particles comprises passing the series of cores along paths through the array so as to produce particulate clusters of the required size. The required paths may be determined by trial and error, by passing test cores through different regions of the array until the required cluster size is obtained, with further cores being directed through the same local region of the array. Alternatively or additionally, where the array thickness and the distribution and/or density of coating particles within the array are known, it may be possible to select a local region of the array which, when cores are passed therethrough, will produce the required size of cluster.

In some embodiments, the distribution of coating particles in at least a local region of the array of coating particles is at least substantially homogeneous. Examples of homogeneous distributions of coating particles include a densely-packed layer of coating particles having a constant layer thickness, and an isotropic solid solution of coating particles in a matrix.

Since the coating particles are homogeneously-distributed, the number of encounters between the core and the coating particles is independent of the location at which the core passes through the array of coating particles, and is related (such as proportional), for a given size and energy of core, to the path length travelled by the core through the array. Without wishing to be bound by theory, it is believed that this results in the formation of particulate clusters having a coating size which is also determined by the path length. Provided that the cores used are of constant size and have constant energy, the required size of particulate cluster can be obtained by selecting the required path length through the array of coating particles (such as by selecting the appropriate thickness and/or density of the array, or the appropriate angle of incidence of the core trajectory with respect to the array of coating particles), and can be readily reproduced by using the same path length to generate subsequent clusters.

In some embodiments, the matrix has a density no greater than 1 $g/cm^3$. It will be understood that references to the density of the matrix refer to the matrix material alone, excluding the contribution from any coating particles. In some further embodiments, the matrix has a density no greater than 500, 200, 100, 50, 20, 10, 5, 2 or 1 $mg/cm^3$. An exemplary low density solid is silica aerogel, which in an evacuated form has a density of 1 $mg/cm^3$. Without wishing to be bound by theory, it is believed that lower densities of matrix reduce the loss of velocity of the core (and hence of the resulting particulate cluster) as it travels through the matrix. Thus, lower matrix densities may allow greater flexibility in the thickness of matrix used. This is particularly useful where the array of coating particles is a three-dimensional array, since it allows greater flexibility as to the path length of the core through the array of coating particles.

In some embodiments, the matrix consists of coating particles. For example, the array of matrix-supported coating particles may comprise a thin sheet of coating particle material, such as a thin sheet of metal. The internal strength of the sheet is thus responsible for maintaining the array of coating particles in their relative positions.

In some embodiments, the matrix is volatile. Thus, for example, the matrix may form a gas at all pressures equal to or less than standard atmospheric pressure at a temperature of 20° C. Alternatively or additionally, the temperature at which the matrix material vaporises (either sublimation directly from the solid, or via an intermediate liquid phase) under perfect vacuum may be less than 200 K, less than 150 K, less than 125 K, less than 100 K, less than 75 K, less than 50 K, or less than 20 K. Such volatility ensures that any matrix material which has adhered to the particulate cluster is easily removed in gaseous form. An exemplary volatile matrix is a cryogenically-solidified gas. Any suitable condensable gas may be used, such as for example $CO_2$, hydrocarbons, fluorocarbons, biological molecules or noble gases. Raising the temperature of the particulate clusters above the vaporisation point of the noble gas (under vacuum) causes the vaporisation of the noble gas, which is then removed.

It will be understood that the vaporisation of the matrix material will not necessarily take place instantaneously, and that matrix material may persist in the cluster (such as for example in a liquid state) for a short period of time. Without wishing to be bound by theory, it is believed that this may sometimes result in the coating having a porous or 'open' structure, which may be advantageous, such as where the surface area of the particulate cluster is important.

In some embodiments, the matrix material has a lower affinity for the core than do the coating particles. For example the dissociation constant for a complex of the matrix material with the core at a given temperature (such as for example at the vaporisation temperature of the matrix material under vacuum) may be at least 10, 100, 1000, $10^4$ or $10^5$ times larger than that for a complex of a coating particle with the core.

In some embodiments, the method comprises passing the core successively through two or more arrays of matrix-supported coating particles. Without wishing to be bound by theory, it is believed that a succession of arrays of coating particles will result in a particulate cluster having multiple layers of coating particles. In some embodiments, the coating particles in one array will have a different chemical composition to the coating particles in another array, thereby producing a particulate cluster having layers of different coating particles.

In some embodiments, the method further comprises treating the particulate cluster after formation. Such treatment may for example alter one or more of the mass, shape, physical structure or chemical composition of the particulate cluster.

In some further embodiments, the method further comprises passing the particulate cluster through a laser beam to heat the particulate cluster. Without wishing to be bound by theory, it is believed that such heating may serve to stabilise the particulate cluster or to alter the properties of the coating, such as by annealing the coating particles within the cluster.

In some further embodiments, the method further comprises exposing the particulate cluster to a fluid which reacts chemically with at least a component of the particulate cluster. The fluid may for example be acidic or basic in nature. In some embodiments, the fluid is a gas. The chemical reaction between the fluid and the particulate cluster component may for example serve to trigger a change in structure of one or both of the core and the coating particles, may initiate chemical bonding between the core and coating particles, and/or may assist in removal of matrix material from the particulate cluster.

In some embodiments, the method further comprises exposing the particulate cluster to a fluid which deposits one or more further species on the particulate cluster. The further species may bind to one or more coating particles. Alternatively or additionally, the further species may be physically trapped within the coating.

In some embodiments, the method further comprises collecting the particulate clusters. In some further embodiments, the clusters are deposited on a surface. For example, the clusters may be deposited on a surface of a metal, metal oxide, semiconductor, or thin film. In some embodiments, the clusters are deposited on a surface which is dissolvable. The surface may be dissolvable in a liquid (e.g. a solution). The liquid may react chemically with at least a component of the particulate cluster. For example, the particular clusters may be deposited on a dissolvable surface which is used to transfer the clusters into a liquid which is capable of chemically functionalising the clusters.

In some further embodiments, the clusters are deposited within the pores of a porous material, such as a zeolite. In some further embodiments, the clusters are deposited within a liquid, such as water.

In some embodiments, the method further comprises a step of selecting particulate clusters according to their size or mass. This may be done by filtering the required sizes of cluster by mass, e.g. using a mass spectrometer or a mass selector.

In some embodiments, the method further comprises replenishment of the array of matrix-supported coating particles. Replenishment of the array may be carried out in the same way as the original creation of the array. For example, replenishment may be carried out by deposition of a layer or film of coating particles onto the external surface of a matrix, or by the formation of a suspension or dispersion of coating particles throughout a 3-dimensional matrix. In some embodiments, the array of matrix-supported coating particles is created and/or replenished by co-deposition of matrix material and coating particles. For example, the array of matrix-supported coating particles may be created and/or replenished by co-deposition of a vaporised matrix material (such as Ar) and evaporated coating particles (such as Ag or Au atoms).

In some embodiments, replenishment of the array of matrix-supported coating particles is carried out in stages. Alternatively, replenishment may be carried out continuously. For example, replenishment of the array may be carried out at the same time as passing the cores through the array. The density and/or thickness of the array, or the distribution of coating particles within the array, may be monitored, for example by optical spectroscopy. The rate of replenishment may be selected to match the rate at which the coating particles are removed from the array by the cores passing through. In this way, the thickness and/or density of the array, and/or the distribution of coating particles within the array, can be kept substantially constant.

Exemplary embodiments of a method according to the invention are described below by way of illustration with reference to the accompanying Figures in which:

FIG. 1(*a*) shows an image of particles obtained by passing $Pd_{55}$ clusters through an argon matrix;

FIG. 1(*b*) shows images of particulate clusters obtained by passing $Pd_{55}$ clusters through an argon matrix onto which gold had been deposited, in accordance with an embodiment of the present invention;

FIG. 2 shows images of particulate clusters obtained by passing $Pd_{561}$ clusters through a gold film deposited on an argon matrix, in accordance with an embodiment of the present invention;

FIG. 3 shows images of particulate clusters obtained by passing $Pd_{923}$ clusters through a gold film deposited on an argon matrix, in accordance with an embodiment of the present invention;

FIG. 4 shows images of particulate clusters obtained by passing $Pd_{2000}$ clusters through a gold film deposited on an argon matrix, in accordance with an embodiment of the present invention;

FIG. 5(*a*) shows an image of a particulate cluster obtained by passing a beam of $Ar^+$ ions though an argon matrix co-condensed with gold atoms, in accordance with an embodiment of the present invention;

A TEM grid was mounted in a sample holder, and thermally connected to a liquid helium-cooled cold finger at ~20 K. This was exposed to a directed stream of gaseous argon from a valve, which condensed on the grid to form a solid matrix, using the method described in W. Harbich et al., *Rev. Sci. Instrum.* 71 (2000), 2818. Gold vapour was then condensed onto the surface of the solid argon to form a thin film of metal, as described in S. A. Nepijko et al., *ChemPhysChem* 6 (2005), 235.

Figure 1A:
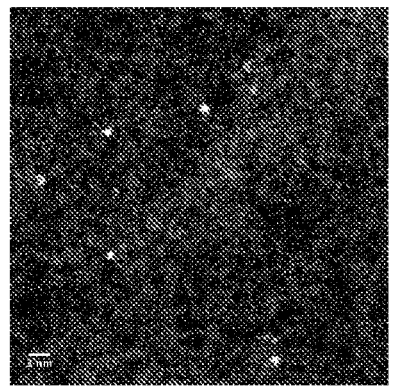
Figure 1B:
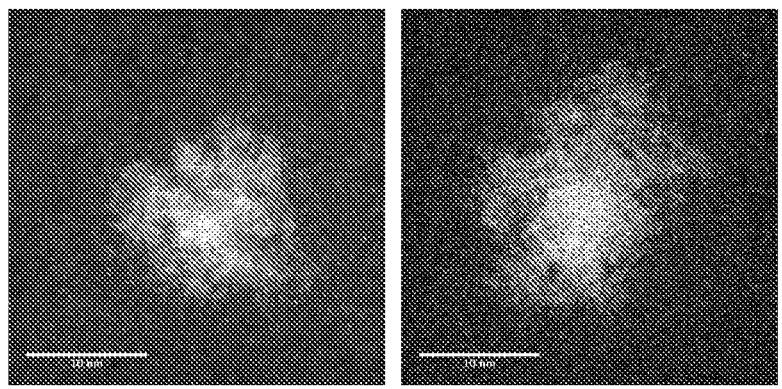
Figure 1B:
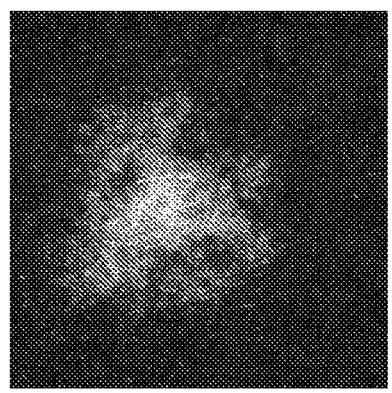

A beam of size-selected palladium $Pd_{55}$ clusters was then focussed through the gold-covered matrix. The resulting clusters were deposited on a carbon surface and the particles' size compared with the particles obtained from a similar process without the gold layer, i.e. passing the clusters through the argon matrix alone. Passing $Pd_{55}$ clusters at 0.5 keV through the Ar matrix alone resulted in an observed particle size of approximately 1 nm (as shown in FIG. 1(a)), which compares well with the theoretical spherical diameter of 1.16 nm. By comparison, passing $Pd_{55}$ clusters at 1.5 keV through the Ar matrix onto which gold had been deposited for 5 s (Au(5 s)/Ar) resulted in an observed particle size of up to 10 nm (as shown in FIG. 1(b)), demonstrating that particle size had increased significantly in some cases. Furthermore analysis by electron energy-loss spectroscopy (EELS) was unable to detect a Pd signal in the particles, indicating that the palladium had been successfully coated.

Figure 2:
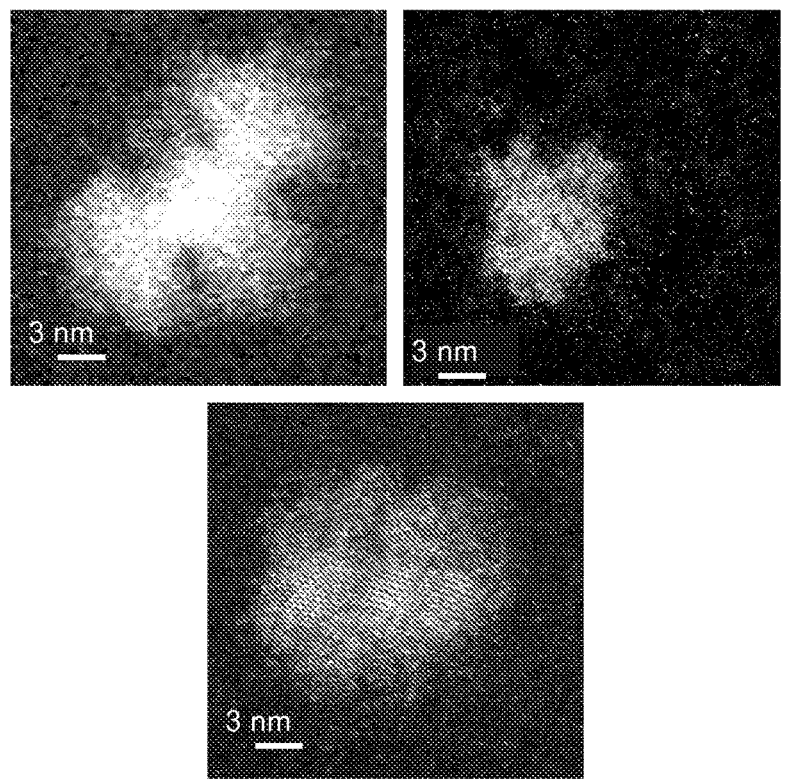

Different palladium cluster sizes, cluster energies, and gold film thicknesses were compared. $Pd_{561}$ clusters at 1 keV were passed through a thinner gold film formed by deposition for 3 s onto Ar. Images of three separate particles are shown in FIG. 2. Again, there was no detection of a Pd signal by EELS.

Figure 3:
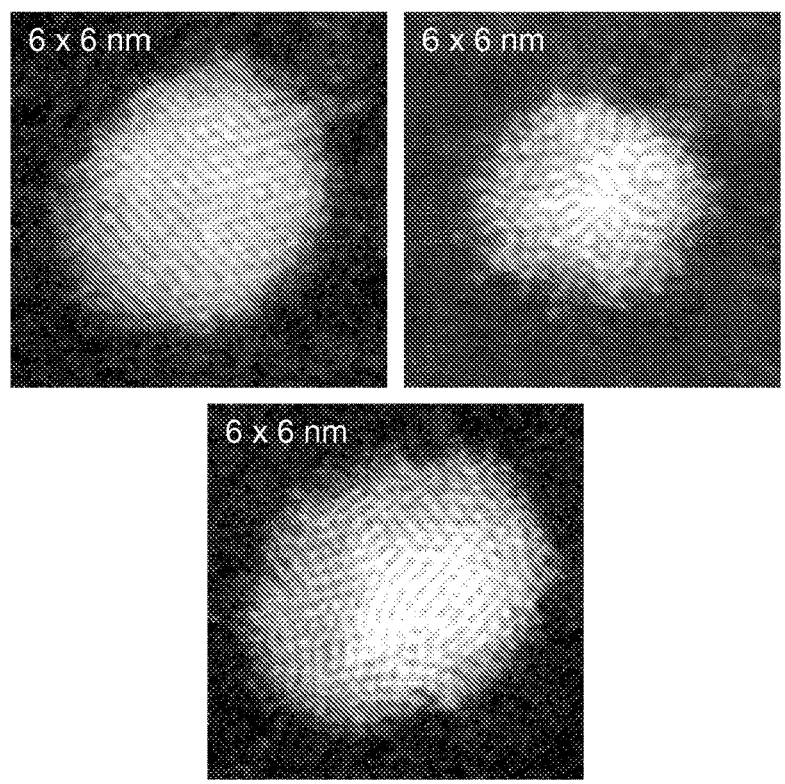

$Pd_{923}$ clusters at 1.5 keV were passed through a gold film formed by deposition for 1 s onto Ar. The observed particle size (5.0 nm) is significantly larger than the theoretical spherical diameter (3 nm) or hemispherical diameter (3.7 nm) expected for a bare $Pd_{923}$ cluster. Images of three separate particles are shown in FIG. 3. In this case, presumably as a result of the larger initial cluster size, a palladium signal was still detectable by EELS.

Figure 4:
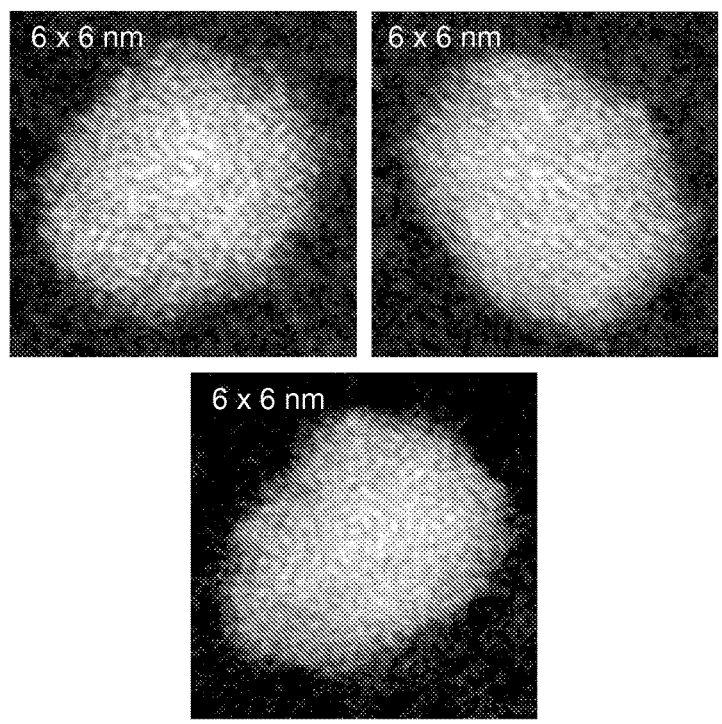

$Pd_{2000}$ clusters at 1.5 keV were passed through a gold film formed by deposition for 1 s onto Ar. Again, the observed particle size (4.9 nm) is larger than the theoretical spherical diameter (3.8 nm) expected for a bare $Pd_{2000}$ cluster. As before, there was a detectable palladium signal by EELS. Images of three separate particles are shown in FIG. 4.

Figure 5A:
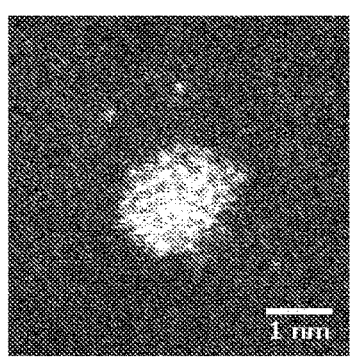
FIG. 5(b) is a graph of the size distribution of the clusters obtained by passing a beam of $Ar^+$ ions though an argon matrix co-condensed with gold atoms.
Figure 5B:
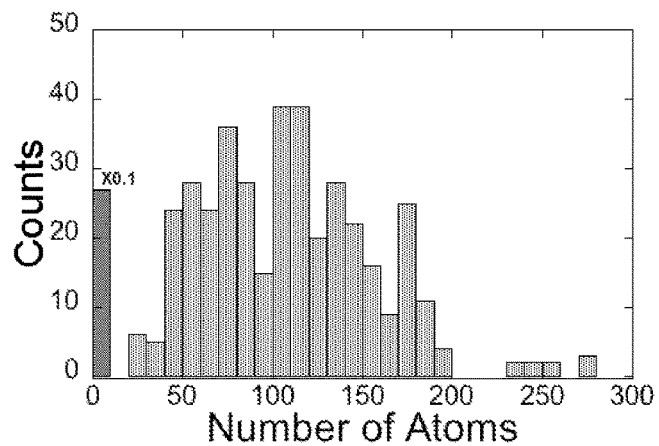

Size-selected Au clusters were generated by the same matrix assembly method described above, but with $Ar^+$ seed ions (i.e. cores). A hot-filament Ar+ sputter cleaning gun was used to fire an ion beam current of ~10 nA at an Ar matrix co-condensed with Au atoms. A STEM image of an Au cluster deposited after the matrix is shown in FIG. 5(a). FIG. 5(b) is a graph of the measured cluster size distribution (plus single atoms used for mass calibration), showing a mean cluster size of ~110 atoms.

Figure 6A:
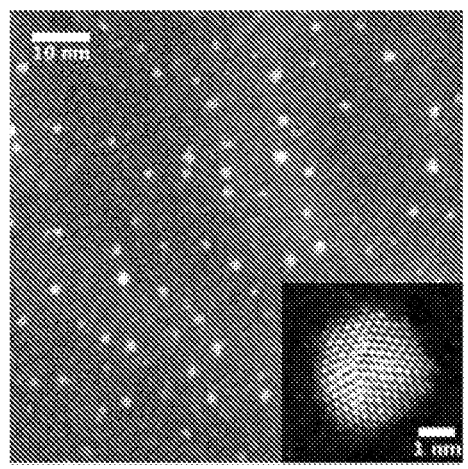
FIG. 6(a) is an image of particulate clusters obtained by passing a beam of $Ar^+$ ions though an argon matrix co-condensed with silver atoms on a quantifoil support, in accordance with an embodiment of the present invention.
Figure 6B:
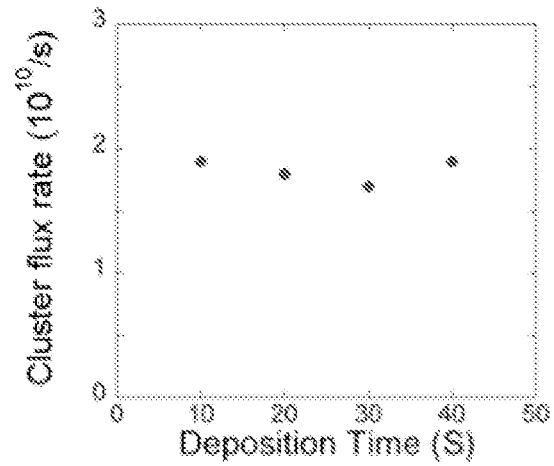
FIG. 6(b) is a plot of cluster flux rate as a function of the deposition time, in relation to the embodiment of FIG. 6(a)
Figure 6C:
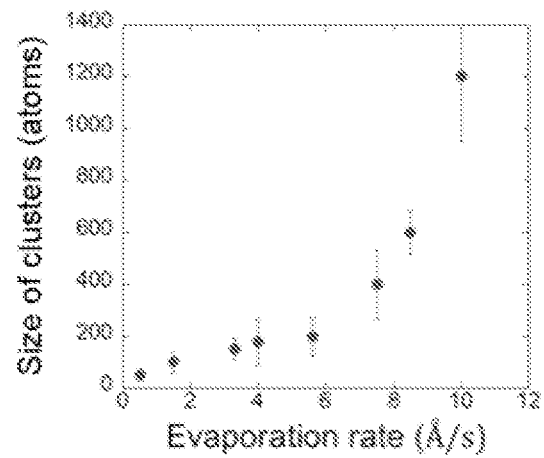
FIG. 6(c) is a plot of cluster size as a function of the silver evaporation rate (i.e. the metal loading of the matrix), in relation to the embodiment of FIG. 6(a).

FIG. 6(a) shows a STEM image of particulate clusters produced by aiming an $Ar^+$ beam current of ~300 nA at an Ar matrix co-condensed with Ag atoms on quantifoil. The Ag coating particles were therefore dispersed through the matrix, rather than being a metal film on top of the matrix. The rate of evaporation of the Ag from an evaporator to form the composite matrix was 1.5 A/s. The deposition time was 5 s. FIG. 6(b) shows that sustained (quasi-continuous) cluster deposition can be achieved by replenishing the metal and matrix. Replenishment of the matrix-supported coating particles was carried out in the same way as creation of the matrix (i.e. by co-deposition of Ag and Ar). Co-deposition to form the matrix-supported coating particles can be carried out in steps or continuously. FIG. 6(c) shows how the median cluster size produced varies with the metal loading (evaporation rate) of the matrix. It was found that the median cluster size rises with increasing loading of the Ar matrix with Ag atoms, demonstrating that the cluster size can be controlled. The deposition time was 60 s.

The invention claimed is:

1. A method for producing particulate clusters, the method comprising passing a core through an array of coating particles supported by a matrix, such that collisions between the core and the coating particles cause the coating particles to become agglomerated and produce particulate clusters, wherein the matrix is formed from a condensed gas.

2. The method according to claim 1, wherein the array of coating particles is in the form of discrete particles of coating material or the array of coating particles is in the form of a continuous network of coating material.

3. The method according to claim 1, wherein the array of coating particles is a three-dimensional array of coating particles.

4. The method according to claim 1, wherein the core consists of an ion, an atom or a molecule or a cluster of one or more types of ion, atom and/or molecule.

5. The method according to claim 1, wherein the coating particles are individual atoms or molecules, or clusters of atoms or molecules.

6. The method according to claim 1, wherein all coating particles are of the same material.

7. The method according to claim 1, wherein the coating particles have the same chemical composition as the core.

8. The method according to claim 1, wherein the coating particles are atoms or clusters of Au, Ag, Cu, Pt, Pd, Ni, Ir, Rh, Co, Fe, Mn, Cr, Si or Ge.

9. The method according to claim 1, comprising passing a series of similarly-sized cores through the array of coating particles along different paths such that each core encounters a similar number of coating particles.

10. The method according to claim 1, wherein the matrix is volatile.

11. The method according to claim 1, wherein the source of the core is an atomic ion beam.

12. The method according to claim 1, further comprising treating the particulate cluster after formation to alter one or more of the mass, shape, physical structure or chemical composition of the particulate cluster.

13. The method according to claim 1, further comprising selecting particulate clusters according to size or mass.

14. The method according to claim 1, wherein the particulate clusters are deposited on a surface, or within the pores of a porous material.

15. The method according to claim 1, wherein the condensed gas comprises a solidified gas.

* * * * *